Feb. 20, 1934.  W. F. SCHILDMAN  1,948,279
PASTEURIZING HOLDER
Filed May 15, 1931  6 Sheets-Sheet 2
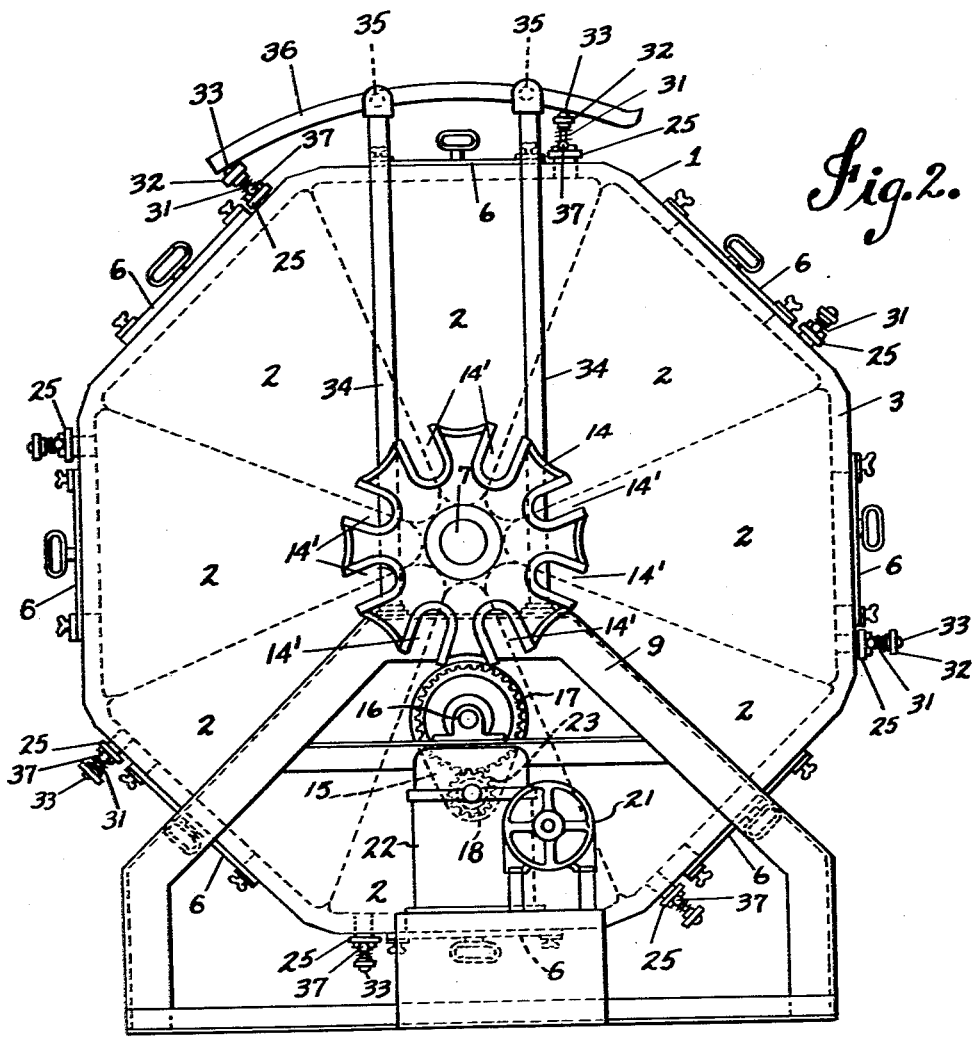
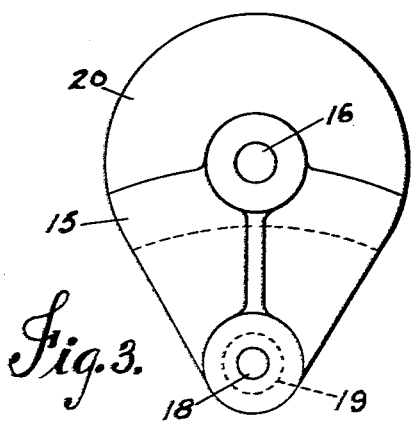
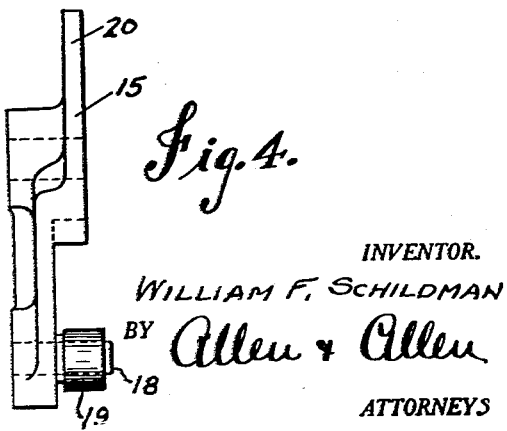
INVENTOR.
WILLIAM F. SCHILDMAN
BY Allen & Allen
ATTORNEYS INVENTOR.
WILLIAM F. SCHILDMAN
BY Allen & Allen
ATTORNEYS Feb. 20, 1934.  W. F. SCHILDMAN  1,948,279
PASTEURIZING HOLDER
Filed May 15, 1931  6 Sheets-Sheet 4

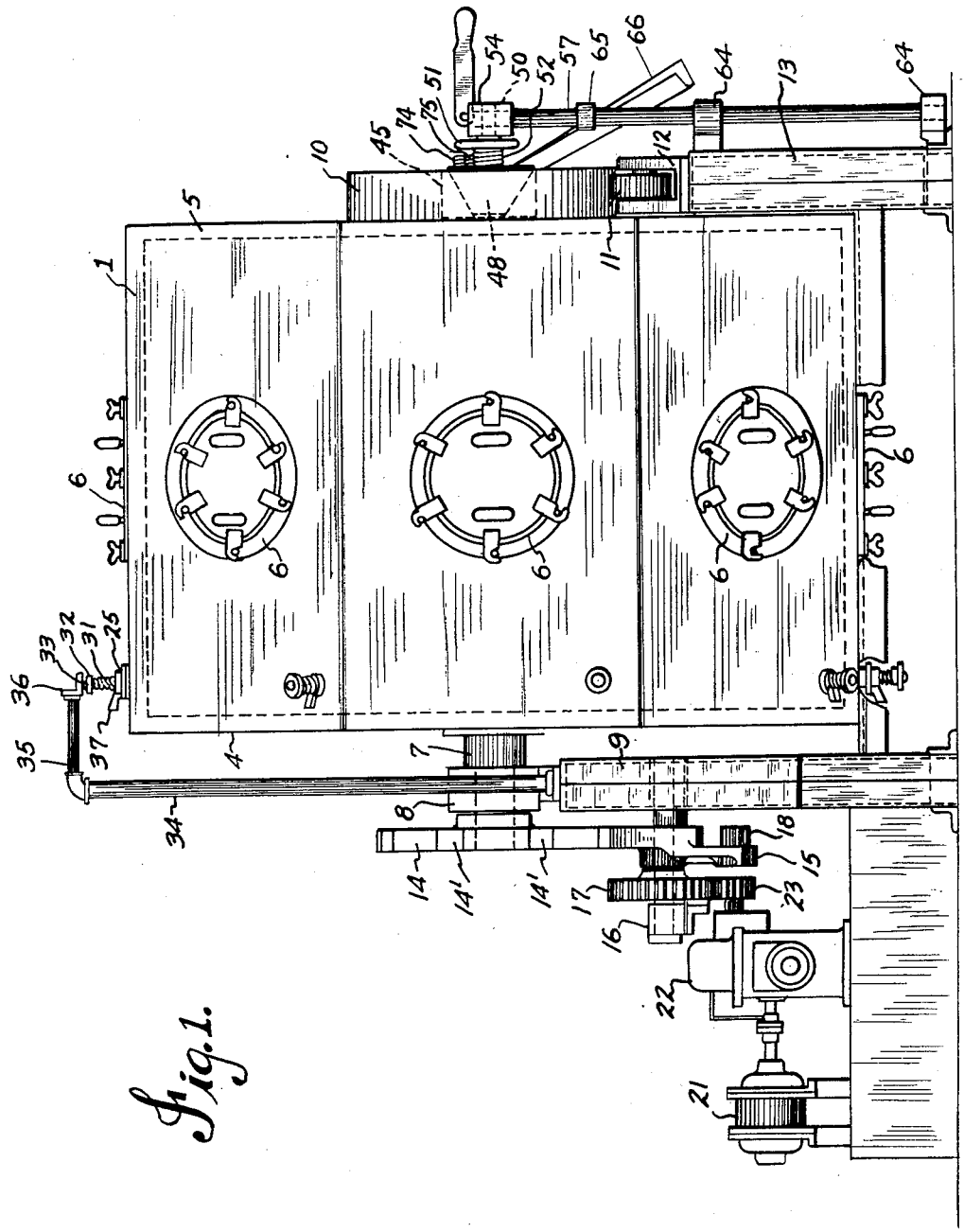

INVENTOR.
WILLIAM F. SCHILDMAN
BY Allen & Allen
ATTORNEYS

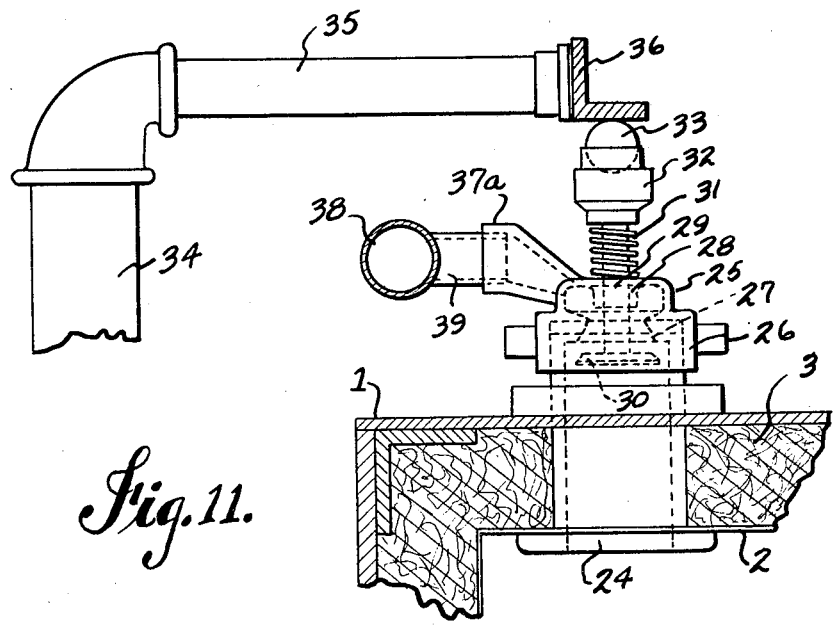
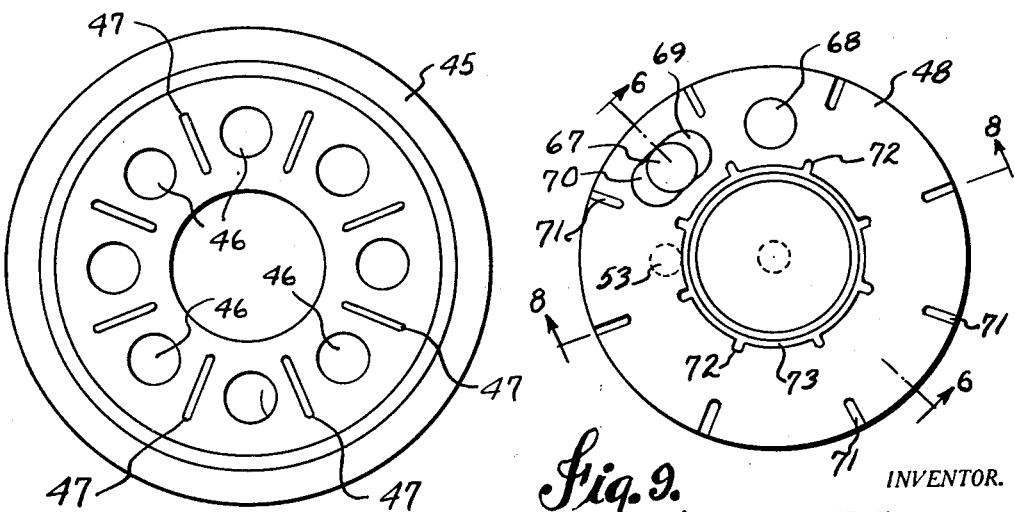

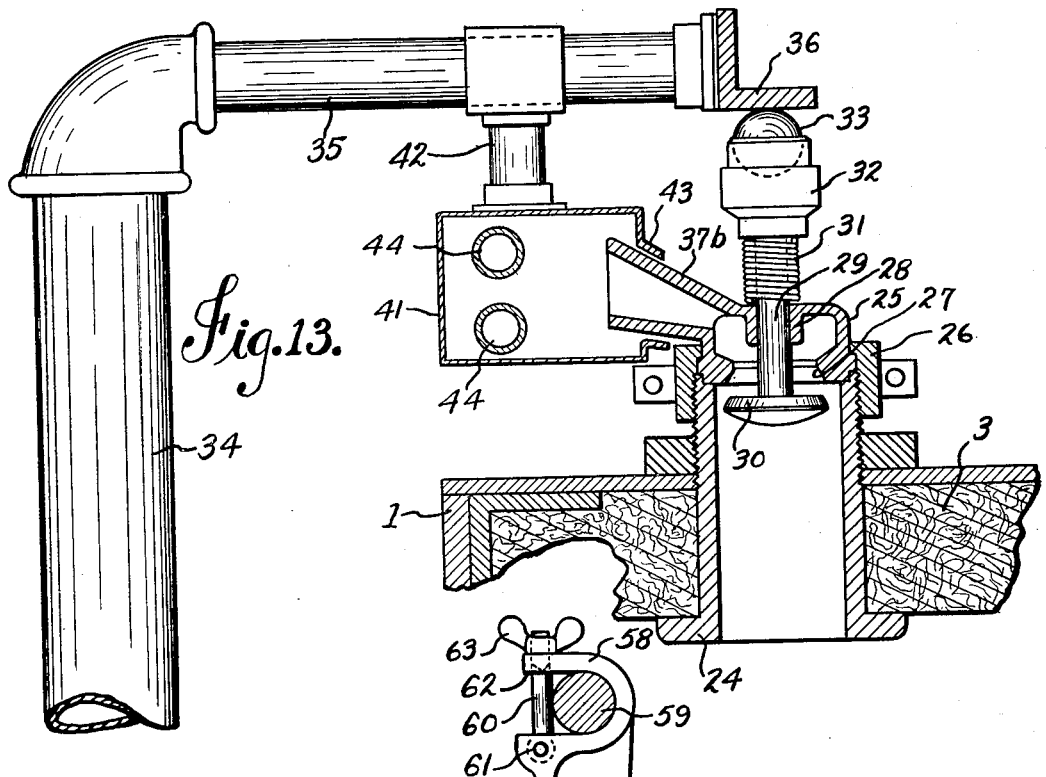
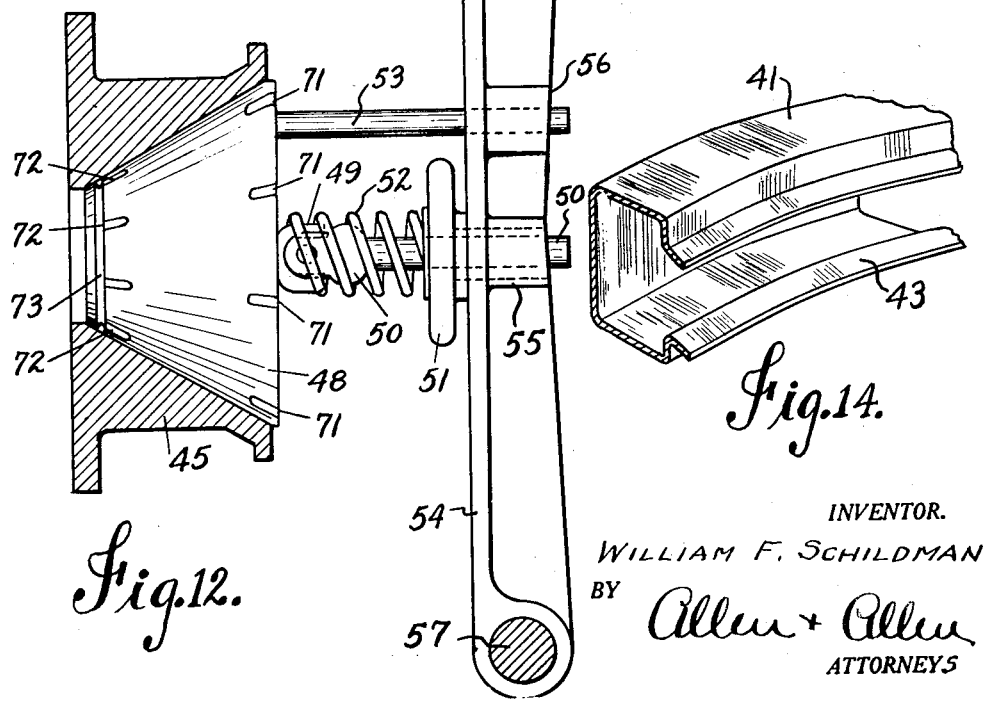

Patented Feb. 20, 1934

1,948,279

UNITED STATES PATENT OFFICE 1,948,279

PASTEURIZING HOLDER

William F. Schildman, Cincinnati, Ohio, assignor to American Copper & Brass Works, Cincinnati, Ohio, a corporation of Ohio Application May 15, 1931. Serial No. 537,699

14 Claims. (Cl. 137—21)

My invention relates to systems or apparatus for holding milk, after the milk has been heated, as a part of the process of pasteurizing the milk.

An object of my invention is to insure that the milk will be held for the proper length of time, so that this length of time cannot be shortened at the will of the operator of the machine. A further object is to insure against the mixing of the less treated milk from the inlet, which might leak at the control valve, with the more treated milk leaving the apparatus. A further object is to relieve the back pressure at the inlet in the period of transition between the connection of succeeding valve ports, when a pump is used to supply the heated milk to the holder.

A further object is to simplify the valve mechanism, and make it more readily accessible for cleaning, adjustment, or repairs. A further object is to provide improved venting of the several compartments of the holder, both with respect to emptying and filling the compartments, and to provide such vent means with a positive operation by a simple device. A further object is to provide such apparatus with substantial support and driving means; and in general, to make such apparatus as simple, substantial, reliable and durable, and economically constructed, as is possible. Other objects will appear in the course of the following description.

In describing the invention more specifically reference is had to the accompanying drawings which form a part of this specification, and wherein is shown an example of an apparatus embodying this invention, but it is to be understood that changes, variations, and modifications can be resorted to which come within the scope of the claims hereunto appended.

In the drawings:

Figure 1 is a side elevation of a device embodying this invention.

Fig. 2 is an elevation of the end that has the driving mechanism.

Fig. 3 is a detail end elevation of the driving crank.

Fig. 4 is a side elevation of the same.

Fig. 9 is an inside end detail view of the valve plug.

Fig. 10 is a view, from the outside, of the valve seat.

Fig. 11 is a front-to-rear vertical section of an upper corner of the holder, illustrating in detail the vent apparatus of one of the compartments constructed according to the modification of Fig. 7, the apparatus being partly in section and partly in elevation.

Fig. 12 is a horizontal cross section on the plane of the line 12, 12 of Fig. 5.

Fig. 13 is a view corresponding to Fig. 11, showing another modification of the vent apparatus.

Fig. 14 is a detail perspective view of part of the last mentioned modification.

Figure 5:
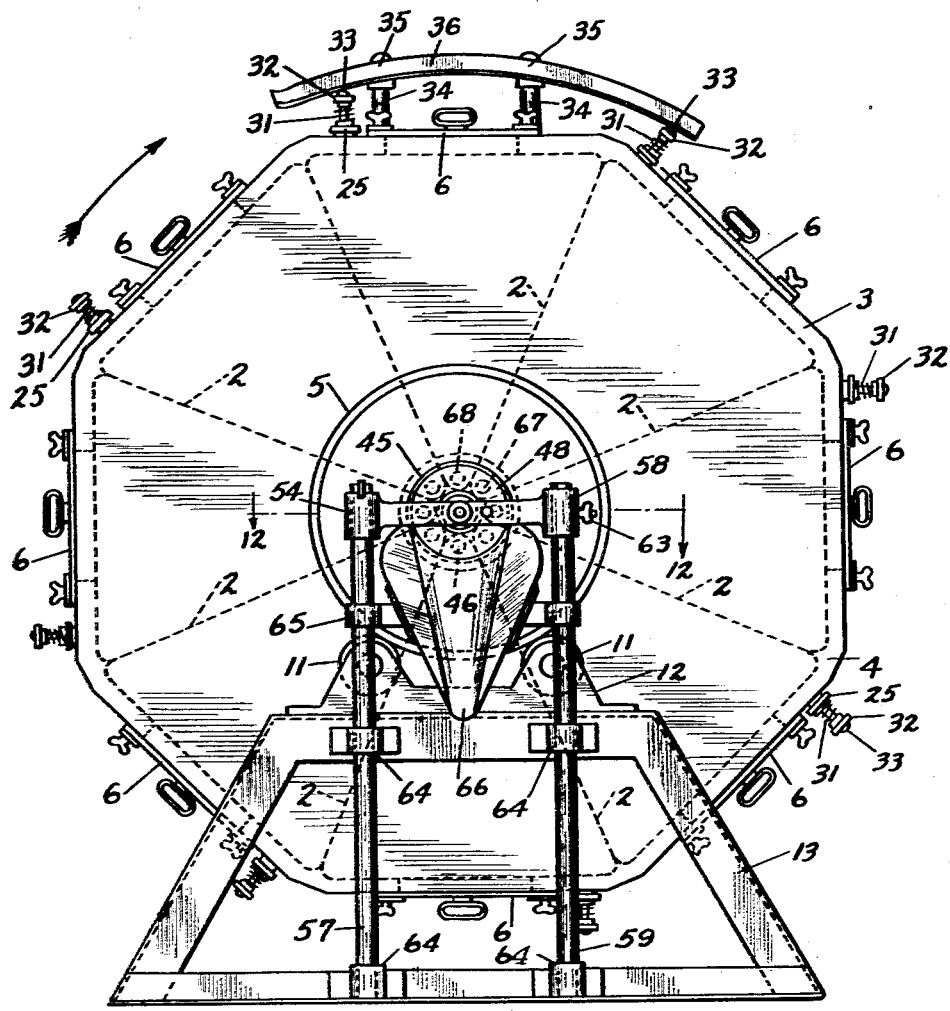
Fig. 5 is an elevation of the inlet and outlet end of the device.
Figure 6:
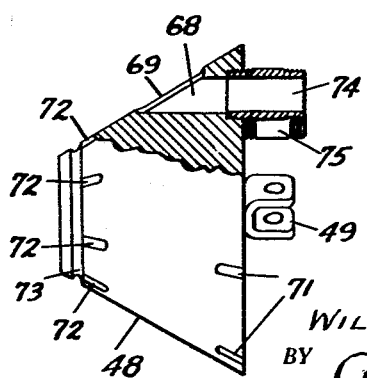
Fig. 6 is a side elevation of the valve plug, partly in cross section on the plane of the line 6, 6 of Fig. 9.

The revolving container 1 is made up of a number of compartments 2, each triangular in a plane at right angles to the axis of revolution; there being in this example eight such compartments, each a separate tank structure, and these compartments being arranged closely together around the axis, so that the container as a whole is octagonal in the plane just mentioned. This assemblage of compartments or tanks 2 is surrounded by a suitable heat insulating wall 3, and similar walls 4 and 5 are provided at their ends. In the outer side of each compartment 2 is a hand hole with a suitable cover 6, which, when removed, permits access to the interior of the compartment 2 for cleaning or repairs.

This rotary container, thus made up, has centrally of its end 4 a shaft 7, running in a bearing 8, on a supporting frame 9; and on its opposite end 5 it has a concentric annular flange 10 resting on rollers 11 journaled in bearings 12 on top of a supporting frame 13.

The object, as is known in this art, is to admit the heated liquid to a compartment 2 and hold it there during a required period of time, in the case of pasteurizing of milk this time being about thirty minutes. This period, with the use of a machine of this kind, is most conveniently defined by one complete revolution of the container 1; and for the purpose of filling each compartment or tank 2, it is desirable to stop the rotation of the container 1 for a sufficient period to fill the container without too rapid entrance and exit, or agitation of the liquid. To serve this purpose the container 1 really is most of the time stationary, the rotary movement to bring the one compartment out of and the next compartment into the desired position being relatively very short. This intermittent rotation is effected, as here shown, by means of a kind of Geneva gearing comprising the radially slotted member 14, fixed on the shaft 7 and crank 15 fixed on a shaft 16, together with a spur gear 17. The wrist 18 of this crank enters each successive slot 14' of the member 14, preferably having on it, as shown in Fig. 4, a roller 19 for easy working. This engagement of the crank wrist in a slot is a small part of the period of rotation of the crank 15, and during the remainder of this rotation a concentric segment 20 of the crank 15 bears against suitably concave peripheral parts of the member 14 between its slots 14', holding the container stationary. The crank 15 is driven by a motor 21, operating through a suitable reducing gearing 22, which has a spur pinion 23 meshing with the crank gear 17. It will be seen that this driving mechanism will give the container 1 the kind of rotation required, as above described.

Another requirement of this invention is that the exit of air upon inflow of liquid to a compartment 2 and the entrance of air thereto upon exit of liquid therefrom, be accompanied with a minimum loss of heat from the liquid, and also be such as to create the least liability of contamination of the milk by germs carried by the air. As shown in Figs. 1, 2 and 5, each compartment 2 has, in its outer side within one corner, a vent valve. Although Figs. 11 and 13 show modifications with respect to the vent apparatus, the detail construction of the valve, the same in each view, will be understood to be that of Figs. 1, 2 and 5. This comprises a nipple 24 extending through the shell of the container 2, and through the insulating wall 3 thereof, and having fastened on its outer end the valve seat body 25, by means of a flange 26 screwed on the threaded outer end of the nipple 24. This valve body 25 has a downwardly facing conical valve seat 27, and its top has a central opening 28, guiding the stem 29 of the conical valve member 30, which is normally held up to its seat 27 by a helical compression spring 31, around the valve stem 29, compressed between the top of the valve body 25 and a head 32 fixed on the upper end of the valve stem. This head has in its top a socket, in which is movably held a ball 33. Standards 34 on the supporting frame 9 at opposite sides of the bearing 8, extend above the top of the container 1, where they have arms 35 extending over the container and having fixed on the ends of these arms a cam bar 36, the lower side of which is substantially concentric with the rotation of the container 1, but radially far enough inward to cause depression of the valve 30 by engagement of the valve ball 33 with the bottom of this bar 36. In each example, the valve body 25 has above its valve seat 27, a spout extending upwardly and out toward the adjacent side of the container 1.

Figure 7:
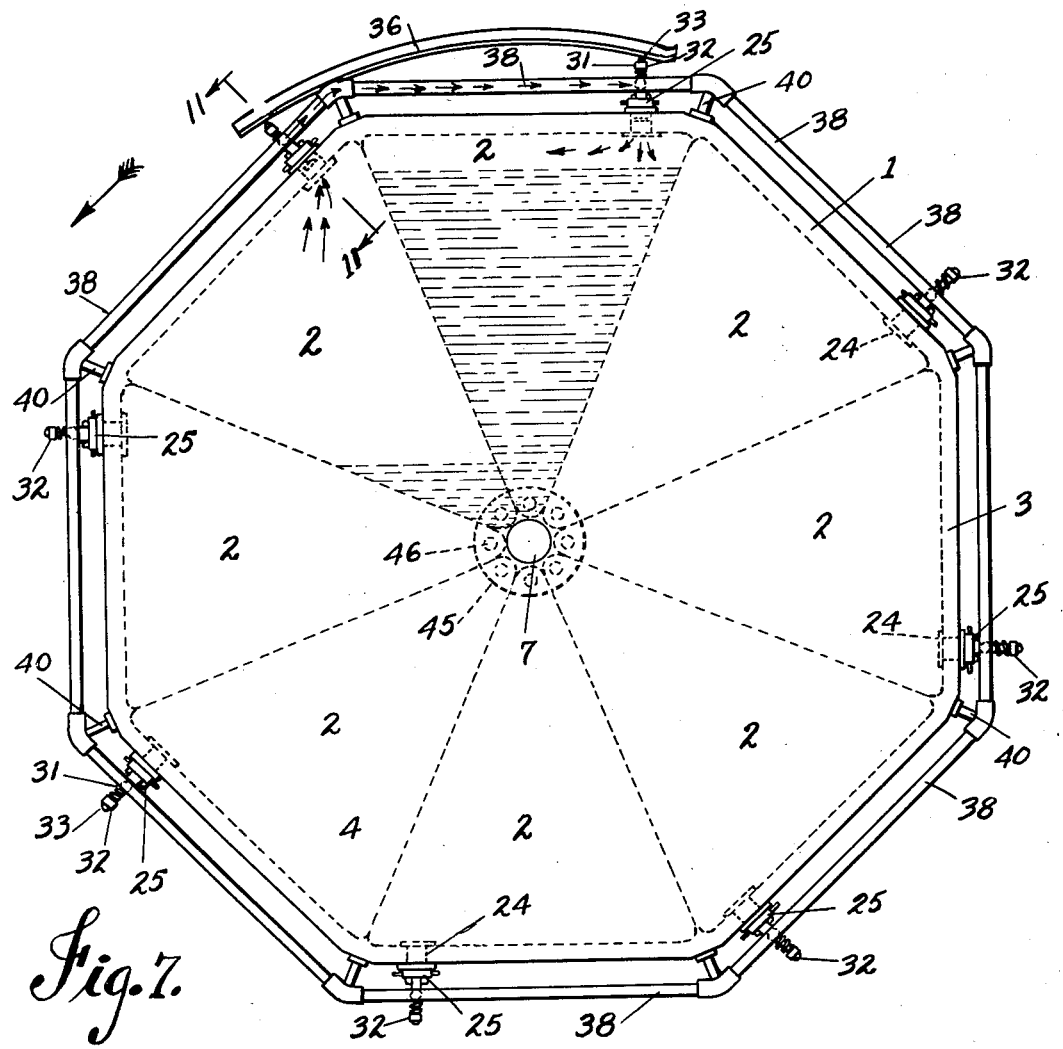
Fig. 7 is an end elevation corresponding to the drive-end elevation of Fig. 2, showing by dotted lines the relative conditions of the liquid and air in two adjacent compartments, as the filling and emptying occurs, and showing also a modification of the vent device.
Figure 8:
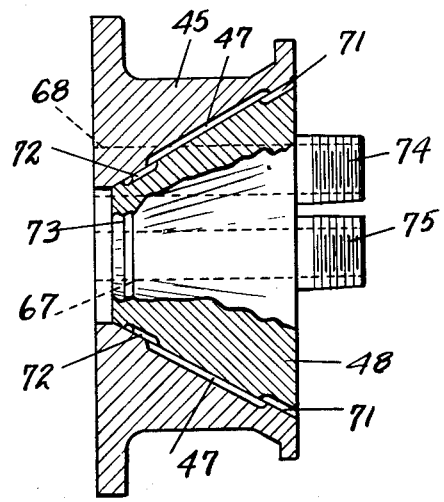
Fig. 8 is a cross section on the plane of the line 8, 8 of Fig. 9, part of the valve plug being in elevation.

In Figs. 1, 2 and 5, the spout 37 opens merely into the atmosphere. In Figs. 7 and 11, the modification consists in connecting the spouts 37a of all of the vent valves to a common pipe or manifold 38, by means of respective nipples 39. This pipe or manifold 38 extends entirely around the container 1 close to the adjacent edge thereof, following the octagonal contour of the container, and being fastened to the container by short posts 40 connecting the coupling elbows of the pipe or manifold 38 with the respective corners of the container, as shown clearly in Fig. 7.

In the further modification of Fig. 13, a segmental box 41 is mounted by means of brackets 42 on the arms 35 that support the common cam bar 36; this box 41 having in its side next to the path of the vent valves, a slot 43 through which the spouts 37b of the vent valves may pass from end to end of the box 41 in the course of revolution of the container 1. Heating elements, such as the steam pipes 44, occupy the interior of this box, being understood to be connected to a suitable source of supply of the heating medium.

Concentric with the opposite end 5 of the container 1 and its flange 10, before described, is the valve seat member 45, fixed to the end 5, and having through it, parallel to the axis, a concentric series of ports 46, from its conical interior into the interiors of respective compartments 2 of the container 1; each such port 46 entering the respective compartment 2 close to its innermost corner, that is, the corner which will be lowermost when the respective compartment 2 is uppermost in the course of revolution of the container 1. Between each two ports 46, the conical interior surface of the seat member 45 has a radial groove 47 extending from near the outer end of the member 45 inward, and terminating some distance from the inner end of the member 45.

The conical valve member 48 has a liquid-tight fit in the conical interior of the member 45. Centrally this valve member 48 has the outwardly extending fork 49 having pinned between its members the inner end part of the adjusting bolt 50, the outer end part of which is threaded and has screwed on it the adjusting hand-wheel 51, compressing the helical spring 52, around this bolt 50, against the outer end of the valve member 48. At one side of this structure a stud 53 is fixed in the outer end of the member 48, extending out parallel with the bolt 50. A yoke 54 extends across, receiving the outer end parts of the bolt 50 and the stud 53 in apertured bosses 55 and 56, respectively. This yoke extends horizontally, with one end pivoted on the upper part of a standard 57, and the other end 58 of this yoke 54 is U-shaped to straddle the upper end part of another similar standard 59; there being a latch bolt 60 pivoted on a pin 61 at one side of the U shape, and swinging into a slot 62 in the other side, and receiving a wing nut 63 outside this other side, to clamp this latch bolt 60 in closed position, whereby it holds the yoke 54 to the standard 59. The two standards 57 and 59 are supported in brackets 64 on the outer side of the adjacent supporting frame 13. Also supported on the standards 57 and 59, by means of ears 65, as best seen in Figs. 1 and 5, is an apron 66, which has its upper cut end away to fit around and under the slightly protruding end of the valve member 48, and slanting outwardly in its downward extent.

This valve member 48 has an inlet port 67 somewhat downward and at one side of the vertical median line of the valve, and the outlet port 68 at the top and substantially on said median line; these ports being the same distance from the center of the valve as the series of ports 46 of the seat member 45, and being of the same circumferential spacing as said seat ports 46. The inlet port 67 at the conical surface of the member 48 has circumferential extensions 69 and 70; the former extension 69 being toward the outlet port 68, and somewhat longer than the latter extension 70. Both extensions 69 and 70 are deep enough to form an adequate passage between the inlet port 67 and any one of the seat member ports 46, after the latter has passed considerably out of registry with the inlet port 67.

Corresponding in number and spacing with the grooves 47 of the conical interior of the seat member 45, are short radial channels 71 extending inward from the outermost periphery of the valve member 48; and also short inner channels 72 extending toward the first mentioned channels 71 from an annular groove 73 in the conical surface of the valve member 48 close to the inner end thereof. The proportions and arrangement of these short channels 71 and 72 are such that as a pair of them is passed by a groove 47 in the conical interior of the seat member 45, the two channels 71 and 72 will communicate with the respective end portions of this seat member groove 47.

Ordinary pipe nipples 74 and 75 are screwed into the outer ends of the inlet and outlet ports 67 and 68, respectively. It will be understood that these will be connected by means of pipe unions with suitable connecting pipes; the pipe thus connected to the inlet nipple 74 being understood to lead from the heater in which the milk is brought to pasteurizing temperature, or from a pump which takes the heated milk from such heater; and the pipe from the outlet nipple 75 being understood to lead to any suitable receptacle for the pasteurized milk, as is well known in the art.

*Operation.*—Beginning with the crank 15 with its wrist down as seen in Fig. 2, upon completion of nearly one half revolution of this crank, this wrist, coming up at the left, begins to engage in one of the slots 14', and thus begins to turn the container 1 over to the right as shown by the arrow in Fig. 5, and this turning will continue for a relatively short interval until the wrist leaves this slot 14', going down at the right in Fig. 2. This interval is just long enough to turn the container the angular distance of the spacing of two adjacent compartments 2; and during the previous turning of the crank wrist out of one slot 14' into the next, the container has been stationary, and the operation is as indicated in Fig. 7, it being understood that this view is taken from the driving end of the machine, and the uppermost container 2 is emptying through its port 46 and the outlet port 68 of the valve member at the opposite end of the machine. This same view shows the compartment 2 next adjacent at the left to be filling, through the inlet port 67 of the valve member, and the port 46 of this next compartment 2. The rotation of the container above described will have occurred after this emptying and filling of the respective compartments 2 has been completed, and when this partial revolution has been completed, the compartment that was just emptied has its port 46 brought into registry with the valve member inlet port 67, while the next compartment 2 at the right (Fig. 7) which has been intermittently moving around filled with the heated milk, will begin to empty. This series of operations is typical of each passage of the crank wrist into and out of a slot 14'.

As clearly indicated by the arrows in Fig. 7, there is in-flow of air to the emptying uppermost compartment 2, and outflow of air from the filling compartment 2 at the left. The two vent valves 25 are kept open during this period of stoppage of revolution of the container 1 by the engagement of their heads with the cam bar 36; and it will be noted in Figs. 2, 5 and 7 that this bar is of the correct circumferential length to hold the two vent valves open at the same time, and is so positioned relative to the circular travel of the vent valves that they will be opened just as their respective compartments 2 bring their ports 46 into registry with the inlet and outlet ports 67 and 68, respectively.

In Figs. 2 and 5, the vent valves will discharge the warm air from a compartment 2 as it fills, and draw in cold air thereto as it is emptied; which is objectionable for two principal reasons, one that the heat left from the milk just previously occupying the compartment 2 is dissipated, and that the air thus taken in from the great body of the atmosphere may contain germs which it is the purpose of the apparatus to destroy. The modification of Figs. 7 and 11 obviates this objection because all of the vent valves being connected by their spouts 37a and the nipples 39 to the surrounding manifold pipe 38, a compartment 2 which is emptying will draw air in from the adjacent compartment which is being filled, and which air is warm from the milk previously in this compartment, and helps to keep up the proper temperature of the milk entering the other compartment. This flow of air from the compartment being filled to the emptying compartment is indicated by the arrows along the pipe 38 in Fig. 7. Also, it will be seen that with this provision practically the same body of air is admitted and expelled repeatedly to and from the successively emptied and filled compartments 2, and has become sterile, and therefore the chance of contaminating the milk from outside atmosphere is practically eliminated.

In the example of Figs. 13 and 14, the air admitted is pre-heated by the elements 44 in the casing 41, and the difficulty of keeping up the temperature in the compartments 2 thus will be avoided; but of course in this example a large amount of the air taken in is from the general atmosphere, with the liability of contamination mentioned in connection with the example of Figs. 2 and 5.

The manner of operation of the valve mechanism made up of the rotating member 45 and stationary member 48, will be understood generally from the description previously given. The conical member 48, held stationary with the yoke 54, by engagement of the stud 53, has the ports 46 of the container 1 brought, in pairs, successively into registry with its inlet and outlet ports 67 and 68. The outlet port 68 at the top of the member, at a higher elevation than the inlet port 68, tends to insure against the partly treated milk entering the holder through the lower inlet port 67 from mixing with the completely treated milk passing from the holder through the upper outlet port 68, should the liquid excluding contact of the conical valve surfaces not be sufficiently close to prevent leakage. This is because any milk leaking between the members 45 and 48 more readily runs downward than upward, and therefore in case of leakage the less pure milk would run down away from the inlet port 68, and the leaking milk that would run down from this port 68 toward the inlet port would be merely completely treated milk mixing with the less treated milk, and going in therewith to be retreated.

The grooves 47 and the channels 71 and 72 also function to advantage in case of leakage of this kind, because milk running down around between the valve members 45 and 48 will run into the first groove 47 which it encounters, and will then run down to the registering channel 72, and into the annular groove 73; therein running down around in both directions to the lower channels 72, and from them into the registering grooves 47, which will carry this leakage to the lower channels 71 at the outer end of the valve member 48, where it will run onto the apron 66, from which it may run onto the floor, and from there to the waste system of the plant.

The extensions 69 and 70 of the inlet port 67 permit prolonged communication between this port and any given one of the ports 46 of the container 1; the purpose of this being to avoid undue rise of pressure in the inlet line when a pump of the positive type is being used to pump the heated milk into the holder. In principle, the extensions are made long enough for one of them to begin passing the edge of the next succeeding container port 46, as the other begins to move away from the last preceding port 46. Thus there will always be some opening from the pump into the container; and as each partial rotation of the container is completed relatively quickly in the manner before described, the period in which the opening is very restricted is really very short.

When it is desired to remove the valve member 48 from the seat member 45, the yoke 54 is unlatched, as before described, and swung outward, carrying the conical valve member 48 with it, which member is free to swing for easy exit from the seat member 45, at the connection in the fork 49. In order to permit this swinging of the valve member 48 outward, the pipe unions, previously mentioned, are unscrewed from the nipple connections 74 and 75. This affords a very convenient access to the interior of the valve for purposes of cleaning its parts, and of keeping it in good liquid-tight condition.

The mounting of the valve end of the container 1 by means of the concentric ring 10 and rollers 11 affords an easy motion of this end of the container, while leaving ample space for the valve mechanism at the center of this end 5. It will be understood that the shaft 7 may extend entirely axially through the container 1 between the inner end parts of the segmental compartments 2, into engagement with the end 5, affording a rigid support where this shaft 7 runs in the bearing 8 at the other end.

A notable advantage is the relatively extensive period during which the container 1 is stationary for filling and emptying, permitting a relatively slow rate of flow of the milk, avoiding undue agitation, foaming, and other undesirable disturbances of the milk; and this advantage also is further realized by the admittance of the milk at the inner end part of the compartment 2, which, since a compartment always is filled while in the upper part of its travel is the bottom end of the compartment. There is, therefore, no splashing of the milk down into the compartment, the filling being quiet from the bottom into the body of milk.

I have illustrated and described a preferred example of my invention rather specifically, as is necessary, but it will be understood that various modifications may occur in practice, and therefore I do not wish to be understood as being limited to such precise disclosure, but what I claim as new and desire to secure by Letters Patent, is:—

1. In apparatus of the character described, a rotary structure comprising a series of radially arranged compartments each having a port near its radially inner end and vent means for inlet and outlet of air near its radially outer end, inlet means and outlet means alternately connecting with said ports incident to rotation of said structure, and means separate and distinct from said inlet and outlet means, whereby said vent means are opened during the periods of connection of the respective ports and closed between said periods.

2. In apparatus of the character described, a rotary series of compartments radially arranged about the center of rotation each having a port and vent means, inlet means and outlet means alternately connecting with said ports incident to rotation of said structure, and a cam bar engageable by said vent means, whereby said vent means are opened during the periods of connection of the respective ports and closed between said periods.

3. In apparatus of the character described, a rotary series of compartments radially arranged about the center of rotation each having a port and vent means, inlet means and outlet means alternately connecting with said ports incident to rotation of said structure, means whereby said vent means are opened during the periods of connection of the respective ports and closed between said periods, and a conduit with which the several vent means are in air receiving and discharging communication.

4. In apparatus of the character described, a rotary series of distinct compartments radially arranged about the center of rotation, centrally located inlet and outlet means for said compartments, and vent means for inlet and outlet of air to and from said compartments, spaced radially outward from said inlet and outlet means farther than they are from the outer ends of the compartments.

5. In apparatus of the character described, a rotary structure comprising a series of radially arranged compartments each having a port and vent means, a valve seat member through which said ports open, a valve member seating in said seat member and having an inlet port and an outlet port with which successive pairs of said compartment ports register, and a support articulately connected to said valve member, movable to carry said valve member into and out of said seat member.

6. In apparatus of the character described, a rotary structure comprising a series of radially arranged compartments each having a port and vent means, a valve seat member through which said ports open, a valve member seating in said seat member and having an inlet port and an outlet port with which successive pairs of said compartment ports register, an element articulately connected to said valve member, and a support on which said element is movable to adjust said valve member against said seat member, said support being movable to carry said valve member into and out of said seat member.

7. In apparatus of the character described, a rotary structure comprising a series of radially arranged compartments each having a port and vent means, a valve seat member through which said ports open, a valve member seating in said seat member and having an inlet port and an outlet port with which successive pairs of said compartment ports register, an element articulately connected to said valve member, a support on which said element is movable, and an adjusting device comprising yielding means to adjust said valve member yieldingly against said seat member, said support being movable to carry said valve member into and out of said seat member.

8. In apparatus of the character described, a rotary series of compartments radially arranged about the axis of rotation, each having a port and vent means, inlet means and outlet means alternately connecting with said ports incident to rotation of said structure, means whereby said vent means are opened during the periods of connection of the respective ports and closed between said periods, and an enclosure rotating with said structure, connecting the vent means of the several compartments together whereby air leaving a compartment being filled enters a compartment being emptied.

9. In apparatus of the character described, a series of compartments rotatable on a substantially horizontal axis and radially arranged about the center of rotation, and means whereby each compartment successively receives and discharges liquid at its radially inner end while above said center of rotation.

10. In apparatus of the character described, a series of compartments rotatable on a substantially horizontal axis and radially arranged about the center of rotation, means whereby each compartment successively receives and discharges liquid at its radially inner end while above said center of rotation, normally closed vent means in the radially outer end part of each compartment, and means for opening each vent means while the respective compartment receives or discharges liquid.

11. In apparatus of the character described, a series of compartments rotatable on a substantially horizontal axis and radially arranged about the center of rotation, means whereby each compartment successively receives and discharges liquid at its radially inner end while above the center of rotation, one compartment receiving while another discharges, normally closed vent means connecting the outer end parts of said compartments when opened, and means for opening said vent means from each compartment while receiving, to the compartment which is discharging.

12. A valve comprising an internally conical outer valve seat member having a series of ports circumferentially arranged in and opening through its conical wall, said valve member rotating on a substantially horizontal axis, and a fixed externally conical inner valve member seating in said outer member, said inner member having an inlet port and an outlet port in its upper part with which successive pairs of said seat member ports register, said seat member having grooves, and said valve member having an annular channel around it near its smaller end and having channels leading to said annular channel and adapted to register with the seat member grooves.

13. A valve comprising an internally conical outer valve seat member having a series of ports circumferentially arranged in and opening through its conical wall, said valve member rotating on a substantially horizontal axis, and a fixed externally conical inner valve member seating in said outer member, said inner member having an inlet port and an outlet port in its upper part with which successive pairs of said seat member ports register, said seat member having grooves, and said valve member having an annular channel around it near its smaller end and having channels leading to said annular channel, and having channels at its larger end, said valve member channels being adapted to register with said seat member grooves.

14. A valve comprising an internally conical outer valve seat member having a series of ports circumferentially arranged in and opening through its conical wall, said valve member rotating on a substantially horizontal axis, and a fixed externally conical inner valve member seating in said outer member, said inner member having an inlet port and an outlet port in its upper part with which successive pairs of said seat member ports register, said seat member having grooves, and said valve member having an annular channel around it near its smaller end and having channels leading to said annular channel, and having channels at its larger end, said valve member channels being adapted to register with the seat member grooves, and said inlet port being at a lower elevation than said outlet port.

WILLIAM F. SCHILDMAN.